United States Patent [19]

Earnhart et al.

[11] Patent Number: 5,522,563

[45] Date of Patent: Jun. 4, 1996

[54] FILM CASSETTE WITH LATCHING DEVICE TO PREVENT SEPARATION OF CASSETTE HALVES

[75] Inventors: Edgar G. Earnhart, Hilton; Douglas M. Csaszar, Alfred; Michael T. Wolf, Rochester, all of N.Y.

[73] Assignee: Eastman Kodak Company, Rochester, N.Y.

[21] Appl. No.: 242,216

[22] Filed: May 13, 1994

[51] Int. Cl.$^6$ .................................................. G03B 17/26
[52] U.S. Cl. ........................... 242/348; 220/306; 220/326
[58] Field of Search ........................... 242/348, 348.1, 242/348.2, 348.3, 348.4, 347.1, 347.2, 588.5, 588.6, 588.3, 596.8, 597.8, 598.6; 354/275; 220/306, 326

[56] References Cited

U.S. PATENT DOCUMENTS

| | | |
|---|---|---|
| 3,617,013 | 11/1971 | Ainslie . |
| 3,648,952 | 3/1972 | Bundschuh . |
| 3,945,584 | 3/1976 | Mangan . |
| 4,160,605 | 7/1979 | Neubaum ............................... 400/208 |
| 4,294,418 | 10/1981 | Gell . |
| 4,420,120 | 12/1983 | Raymond ............................ 242/348.4 |
| 5,131,558 | 7/1992 | Hiromori ................................ 220/326 |
| 5,193,759 | 3/1993 | Bigelow ............................... 242/348.4 |
| 5,251,839 | 10/1993 | Zander et al. ............................ 242/348 |
| 5,346,081 | 9/1994 | Lin ...................................... 220/326 X |

Primary Examiner—John M. Jillions
Attorney, Agent, or Firm—Roger A. Fields

[57] ABSTRACT

A film cassette comprises a pair of housing parts, and a flexibly movable latching hook located on one of the housing parts and a rigid latching catch located on the other housing part which can engage to secure the two housing parts together. According to the invention, a backer projects from one of the housing parts into abutment with the latching hook, when the latching hook and the latching catch are engaged, to prevent the latching hook from moving out of engagement with the latching catch in response to a mechanical shock being applied to the film cassette.

1 Claim, 6 Drawing Sheets

FILM CASSETTE WITH LATCHING DEVICE TO PREVENT SEPARATION OF CASSETTE HALVES

FIELD OF THE INVENTION

The invention relates generally to the field of photography, and in particular to film cassettes. More specifically, the invention relates to a film cassette with a latching device for preventing separation of a pair of cassette halves.

BACKGROUND OF THE INVENTION

It is generally known for a film cassette to comprise a pair of housing parts, and a flexibly movable latching hook located on one of the housing parts and a rigid latching catch located on the other housing part which can engage to secure the two housing parts together. See, for example, prior art U.S. Pat. No. 4,294,418, issued Oct. 30, 1981, U.S. Pat. No. 4,160,605, issued Jul. 10, 1979, U.S. Pat. No. 3,648,952, issued Mar. 4, 1972, and U.S. Pat. No. 3,617,013, Nov. 2, 1971.

A problem occurring with the latching hook and the latching catch in the film cassette is that when the film cassette is subjected a mechanical shock due to its being dropped onto a hard surface, for example, the latching hook might move out of engagement with the latching catch. Prior art U.S. Pat. No. 3,648,952 suggests as a solution preventing the latching hook from assuming a completely unflexed position when it engages the latching catch. Thus, the biased condition of the latching hook might maintain it in engagement with the latching catch even though a mechanical shock is applied to the film cassette.

SUMMARY OF THE INVENTION

According to the invention, a film cassette comprising a pair of housing parts, and a flexibly movable latching hook located on one of the housing parts and a rigid latching catch located on the other housing part which can engage to secure the two housing parts together, is characterized in that:

a backer projects from one of the housing parts into abutment with the latching hook, when the latching hook and the latching catch are engaged, to prevent the latching hook from moving out of engagement with the latching catch in response to a mechanical shock being applied to the film cassette.

DETAILED DESCRIPTION OF THE INVENTION

The invention is disclosed as being embodied preferably in a film cassette. Because the features of a film cassette are generally known as shown in prior art U.S. Pat. No. 5,122,820, the description which follows is directed in particular to elements forming part of or cooperating directly with the disclosed embodiment. It is to be understood, however, that other elements not specifically shown or described may take various forms known to persons of ordinary skill in the art.

The Film Cassette—General

Figure 1:
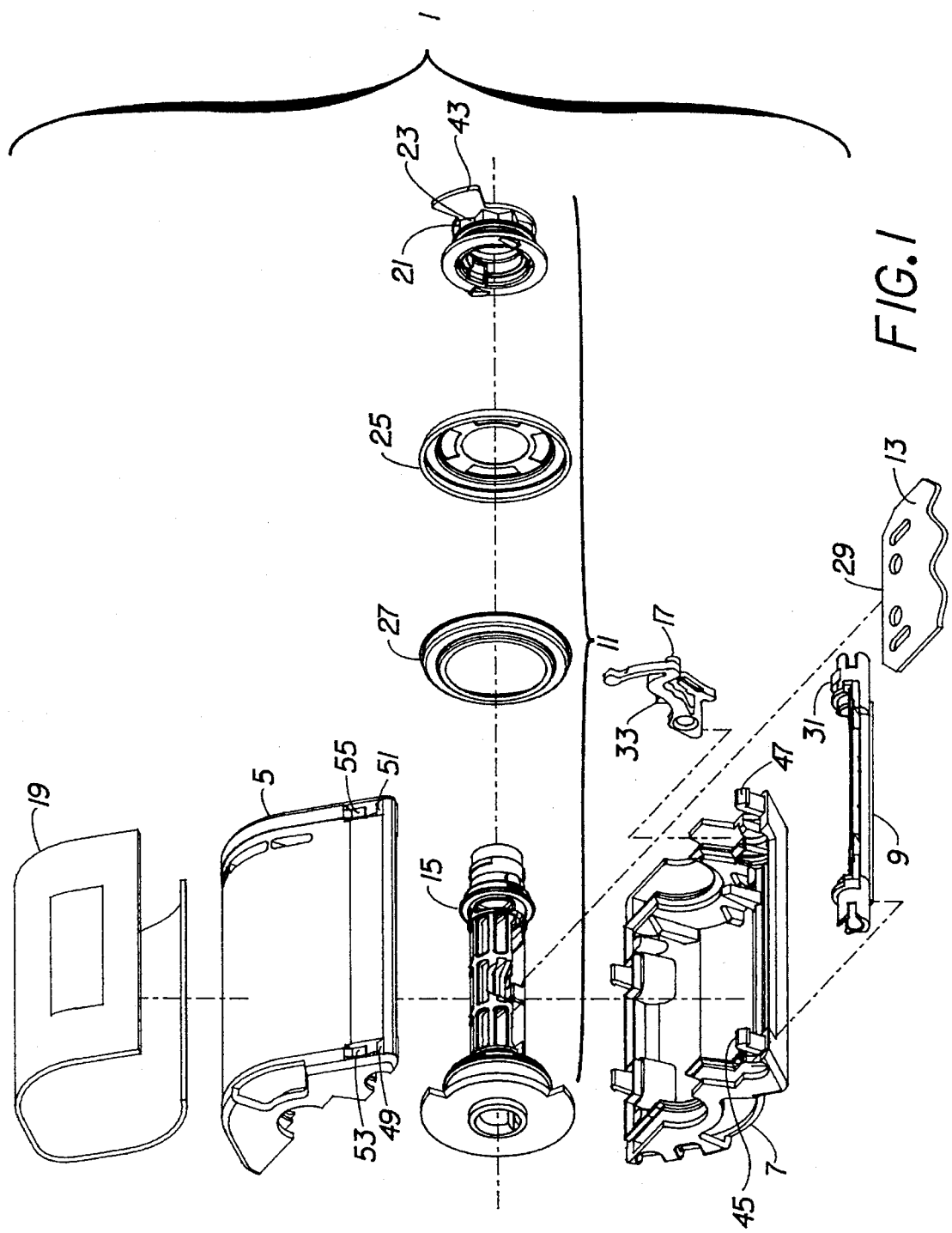
FIG. 1 is an exploded perspective view of a film cassette in accordance with a preferred embodiment of the invention.
Figure 3:
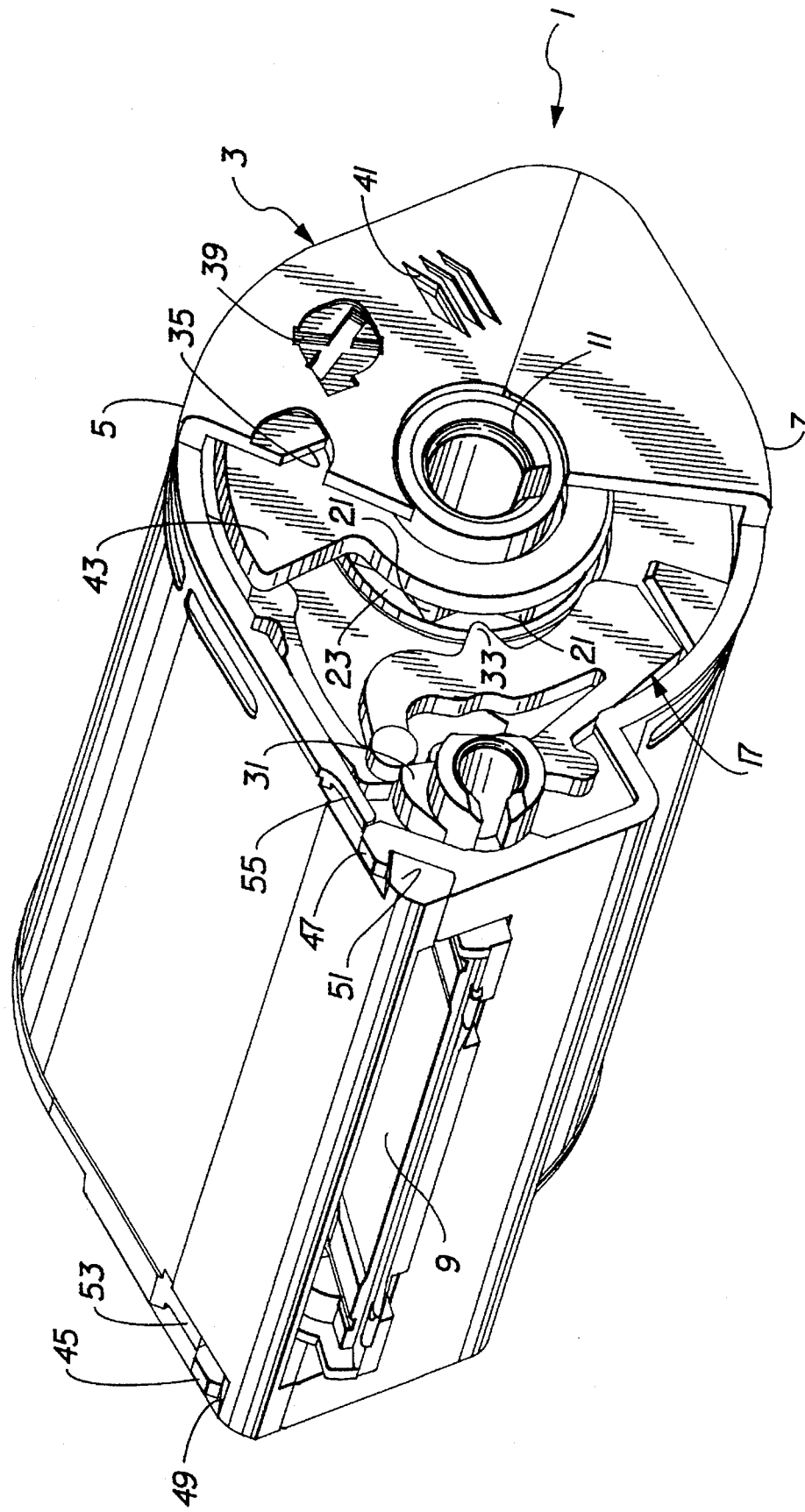
FIG. 3 is an assembled perspective view of the film cassette depicted with part of the cassette shell cut away to show a spool lock and a latching device.

Referring now to the drawings, FIG. 1 is an exploded perspective view of a film cassette 1 in accordance with a preferred embodiment of the invention, and FIG. 3 is an assembled perspective view of the film cassette depicted partly cut away to show certain details of its interior. Generally, the film cassette 1 comprises a cassette shell or housing 3 made up of two mating shell or housing halves 5 and 7, a light-shielding door 9 closed to prevent ambient light from entering the cassette interior through a film egress/ingress slot located between the two shell halves and opened to permit film movement into and out of the cassette interior via the film egress/ingress slot, a film spool 11 supported for rotation inside the cassette shell in opposite film unwinding and film winding directions to unwind a filmstrip 13 off the spool core 15 and to wind the filmstrip onto the spool core, a spool lock 17 for engaging the spool core to prevent rotation of the film spool and out of engagement to release the film spool, and a cassette covering label 19.

Figure 5:
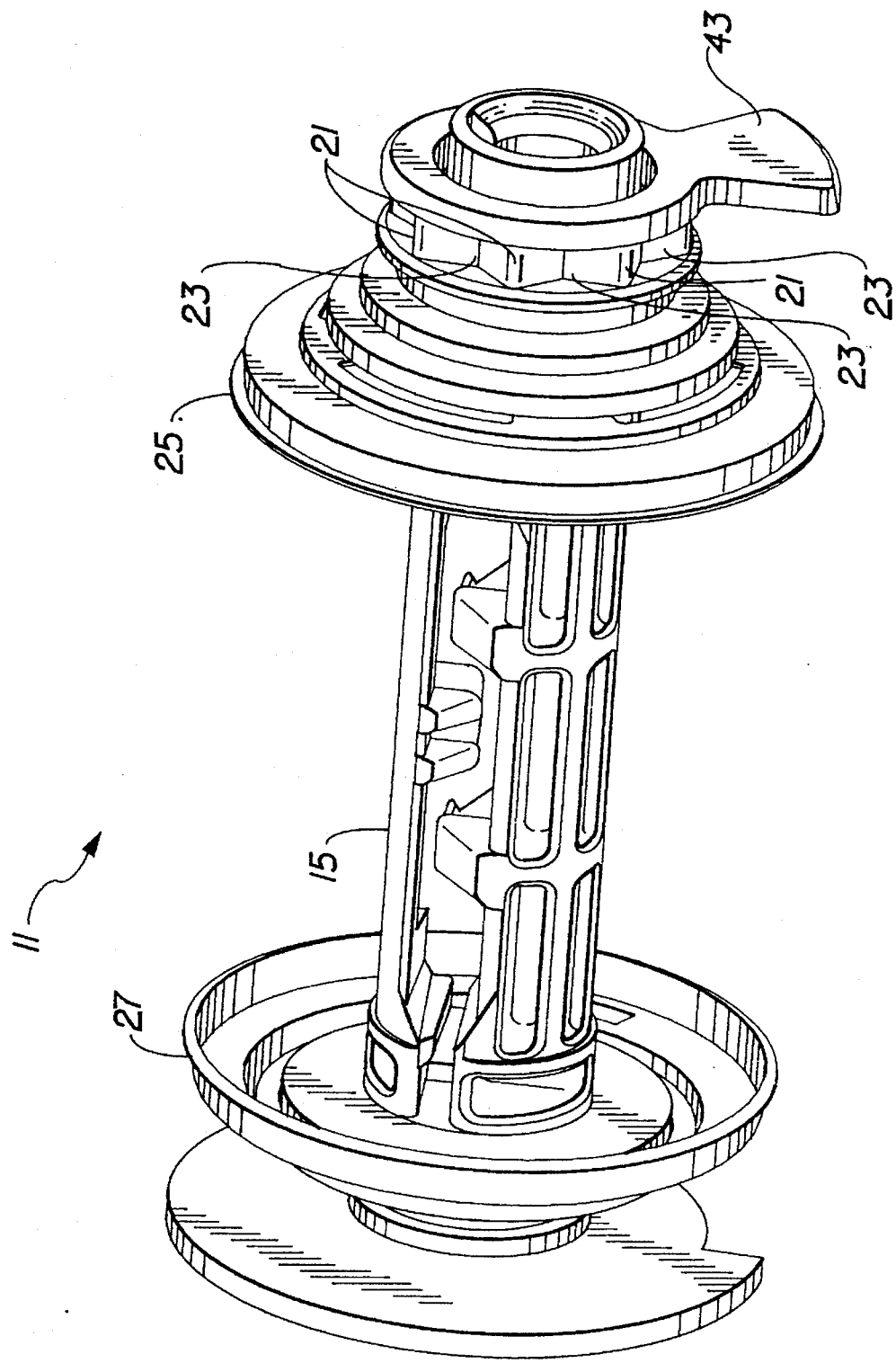
FIG. 5 is a perspective view of a film spool which is rotatably supported inside the cassette shell.

The spool core 15 as shown in FIGS. 1, 3, and 5 has a toothed periphery consisting of successive symmetrical teeth 21 separated by interdental spaces 23, and it supports a pair of coaxial flanged disks 25 and 27 between which the filmstrip 13 is stored in roll form. A trailing or inner end 29 of the filmstrip 13 is attached to the spool core 15.

The light-shielding door 9 as shown in FIGS. 1 and 3 includes integral cam means 31 for pivoting the spool lock 17 to a locking position as the door is closed. When the spool lock 17 is in its locking position, not shown, an integral detent 33 of the spool lock is located in anyone of the interdental spaces 23 between two adjacent teeth 21 of the spool core 17 to secure the film spool 11 in anyone of a number of rotational orientations equal to the number of interdental spaces. If the light-shielding door 9 is opened as shown in FIG. 3, its cam means 31 is retracted from the spool lock 17. As a result, forcible rotation of the film spool 11 in the film winding or film unwinding direction will cause one of the two adjacent teeth 21 between which the detent 33 is located to eject the detent from the interdental space 23 separating those two teeth. Thus, the spool lock 17 will be pivoted out of its locking position.

The Film Exposure-Status Indicating Means of the Film Cassette

Figure 2:
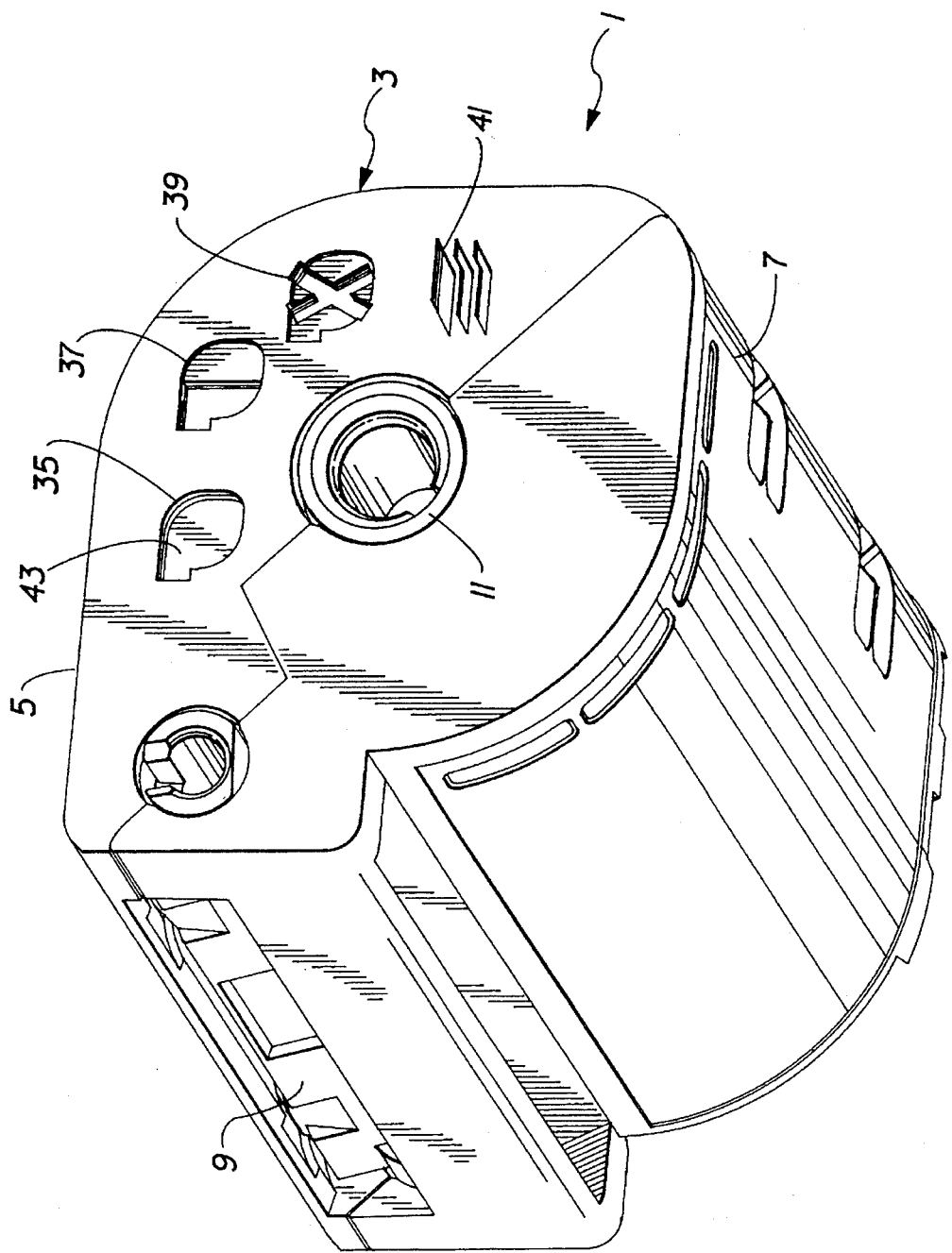
FIG. 2 is an assembled perspective view of the film cassette.
Figure 4:
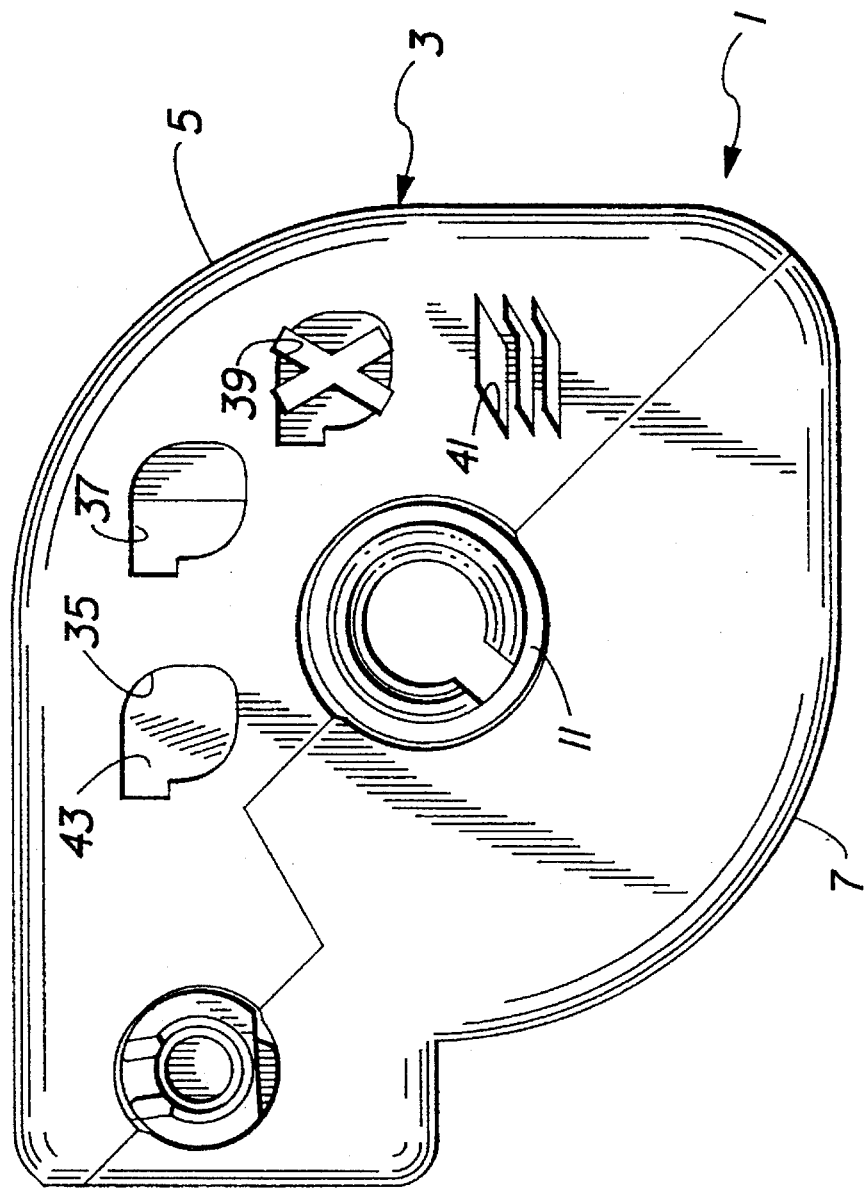
FIG. 4 is an end view of the film cassette depicting several film exposure-status icons.

The shell half 5 at one of its ends has four icons in the form of respective cut-outs 35, 37, 39, and 41 shown in FIGS. 2 and 4. The cut-out 35 is designed to effect an indication that the filmstrip 13 is fresh or unexposed. The cut-out 37 is designed to effect an indication that the filmstrip 13 is partly exposed (and partly unexposed). The cut-out 39 is designed to effect an indication that the filmstrip 13 is fully exposed. The cut-out 41 is designed to effect an indication that the filmstrip 13 has been processed in a film processing machine to develop the latent images on the exposed film.

An indicator flag 43 is coaxially fixed to the spool core 15 as shown in FIGS. 1 and 5, to be rotated with the film spool 11 in the film unwinding and film winding directions. Initially the flag 43 is secured with the film spool 11 in a rotational orientation that locates the flag immediately beneath the cut-out 35 as shown in FIGS. 2 and 4, to be visible to provide an indication that the filmstrip 13 is fresh or unexposed. Conversely, when the flag 43 is secured with the film spool 11 in a rotational orientation that locates the flag immediately beneath the cut-out 37, it is visible to provide an indication that the filmstrip 13 is partly exposed (and partly unexposed). When the flag 43 is secured with the film spool 11 in a rotational orientation that locates the flag immediately beneath the cut-out 39, it is visible to provide an indication that the filmstrip 13 is fully exposed. When the flag 43 is secured with the film spool 11 in a rotational orientation that locates the flag immediately beneath the cut-out 41, it is visible to provide an indication that the filmstrip 13 has been processed.

The Latching Device of the Film Cassette

Figure 6:
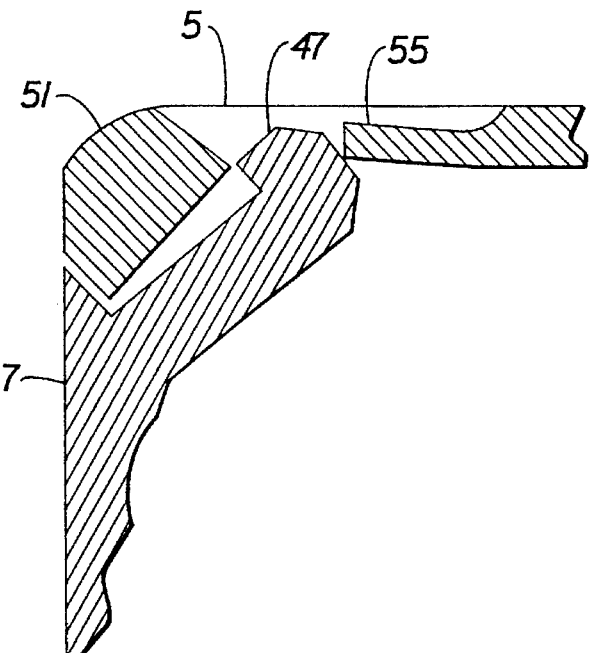
FIGS. 6 and 7 are sectional views of the latching device.

A pair of flexibly movable latching hooks having free-end hooking portions 45 and 47 are located on the shell half 7. A pair of mating rigid latching catches 49 and 51 are located on the shell half 5. The hooking portions 45 and 47 and the latching catches 49 and 51 can engage to secure the two shell halves 5 and 7 together. See FIGS. 1, 3, 6 and 7. In particular, FIGS. 6 and 7 depict how the hooking portions 45 and 47 are moved into respective engagement with the latching catches 49 and 51.

Figure 7:
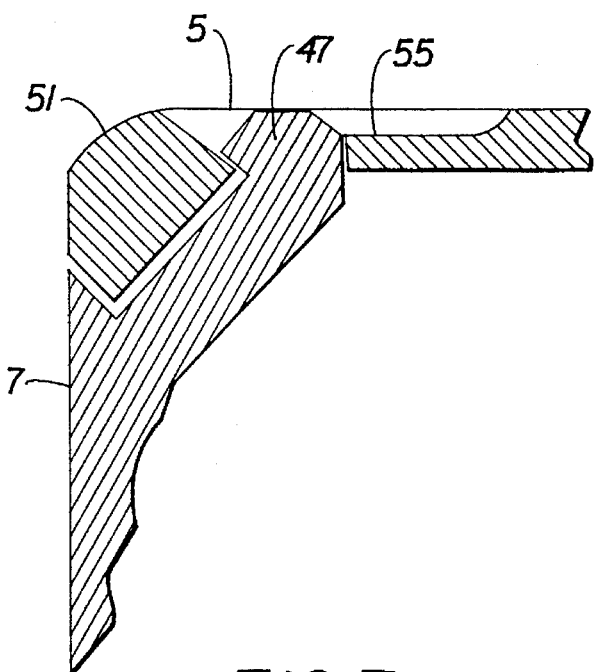

A pair of flexibly movable backers or beams 53 and 55 are located on the shell half 5 to project longitudinally into respective end-wise abutment with the hooking portions 45 and 47 when the hooking portions are engaged with the latching catches 49 and 51 as shown in FIGS. 3 and 7. The backers 53 and 55 prevent the hooking portions 45 and 47 from moving out of engagement with the latching catches 49 and 51 in response to a mechanical shock being applied to the film cassette 1 when, for example, the film cassette 1 is dropped onto a hard surface.

The invention has been described with reference to a preferred embodiment. However, it will be appreciated that variations and modifications can be effected by a person of ordinary skill in the art without departing from the scope of the invention.

PARTS LIST 1. film cassette
3. cassette shell
5 & 7. shell halves
9. light-shielding door
11. film spool
13. filmstrip
15. spool core
17. spool lock
19. covering label
21. spool teeth
23. interdental spaces
25 & 27. spool disks
29. trailing film end
31. camming means of door
33. detent of spool lock
35, 37, 39, & 41. four icon cut-outs
43. flag
45 & 47. latching hooks
49 & 51. latching catches
53 & 55. backers

We claim:

1. A film cassette comprising a pair of housing parts, a rigid latching catch located on one of said housing parts, and a flexibly movable latching hook projecting from the other housing part with a free-end hooking portion for engaging said latching catch to secure the two housing parts together, is characterized in that:

a longitudinally-straight beam projects lengthwise from one of said housing parts directly to said free-end hooking portion to position a free end of said beam to abut the hooking portion when the hooking portion engages said latching catch, to prevent said hooking portion from being moved out of engagement with said latching catch due to a mechanical shock being applied to said film cassette, and is flexibly movable to allow the hooking portion to be disengaged from the latching catch.

\* \* \* \* \*